(12) United States Patent
Nickel et al.

(10) Patent No.: US 9,919,669 B2
(45) Date of Patent: Mar. 20, 2018

(54) FRONT SECTION FOR A MOTOR VEHICLE

(71) Applicant: GM GLOBAL TECHNOLOGY OPERATIONS LLC, Detroit, MI (US)

(72) Inventors: Marco Nickel, Ruesselsheim (DE); Martin Likar, Ruesselsheim (DE)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 0 days.

(21) Appl. No.: 15/088,729

(22) Filed: Apr. 1, 2016

(65) Prior Publication Data

US 2016/0288750 A1   Oct. 6, 2016

(30) Foreign Application Priority Data

Apr. 2, 2015  (DE) .................. 10 2015 004 420

(51) Int. Cl.
*B60R 19/48* (2006.01)
*B60R 19/18* (2006.01)

(52) U.S. Cl.
CPC ............ *B60R 19/483* (2013.01); *B60R 19/18* (2013.01); *B60R 2019/1806* (2013.01); *B60R 2019/1866* (2013.01)

(58) Field of Classification Search
CPC . B60R 19/04; B60R 19/48; B60R 2019/1866; B60R 2019/1806
See application file for complete search history.

(56) References Cited

U.S. PATENT DOCUMENTS

| | | | |
|---|---|---|---|
| 4,249,632 A * | 2/1981 | Lucchini ................. | B60R 21/38 180/274 |
| 7,484,779 B2 * | 2/2009 | Takahashi ............. | B60R 19/483 293/117 |
| 8,408,613 B1 * | 4/2013 | Tanton ................... | B60R 19/18 293/109 |
| 8,864,196 B2 | 10/2014 | Shamoto | |
| 9,067,553 B1 * | 6/2015 | Ghannam ........... | B60R 21/0136 |
| 9,254,800 B2 * | 2/2016 | Nilsson ................ | B60R 19/24 |
| 2005/0200139 A1 * | 9/2005 | Suzuki ................ | B60R 21/0136 293/117 |
| 2007/0114803 A1 * | 5/2007 | Takahashi ............. | B60R 19/483 293/102 |
| 2009/0108598 A1 * | 4/2009 | Takahashi ............. | B60R 19/483 293/107 |

(Continued)

FOREIGN PATENT DOCUMENTS

| DE | 102010022686 A1 | 1/2011 |
|---|---|---|
| DE | 102012101297 A1 | 4/2013 |

(Continued)

OTHER PUBLICATIONS

Great Britain Patent Office, Great Britain Search Report for Great Britain Application No. GB1605276.3, dated Aug. 30, 2016.

(Continued)

*Primary Examiner* — Pinel E Romain
(74) *Attorney, Agent, or Firm* — Lorenz & Kopf LLP

(57) ABSTRACT

A front section of a motor vehicle includes a bumper shell, a bumper cross member and a shock sensor arranged at various locations inside a central intermediate space between the bumper shell and the bumper cross member. The bumper shell extends beyond the ends of the bumper cross member in the direction transverse to the vehicle. Extensions are attached to the ends of the bumper cross member, and the shock sensor is also distributed in various locations in peripheral intermediate spaces between the extensions and the bumper shell.

11 Claims, 2 Drawing Sheets

(56) References Cited

U.S. PATENT DOCUMENTS

| | | | | |
|---|---|---|---|---|
| 2009/0315344 | A1* | 12/2009 | Joly-Pottuz | B60R 19/48 |
| | | | | 293/108 |
| 2009/0322107 | A1* | 12/2009 | Takahashi | B60R 21/0136 |
| | | | | 293/121 |
| 2010/0253102 | A1* | 10/2010 | Riviera | B60R 19/12 |
| | | | | 293/121 |
| 2013/0127190 | A1* | 5/2013 | Shamoto | B60R 19/18 |
| | | | | 293/117 |
| 2016/0039378 | A1 | 2/2016 | Foo et al. | |
| 2016/0347270 | A1* | 12/2016 | Higashimachi | B60R 19/04 |

FOREIGN PATENT DOCUMENTS

| | | | |
|---|---|---|---|
| DE | 102014113824 A1 | 5/2015 | |
| JE | 10306605 A1 | 8/2004 | |
| JE | 102013017415 A1 | 7/2014 | |
| JP | 2008030641 A | 2/2008 | |
| JP | 2011245910 A | 12/2011 | |
| JP | 2015030323 A | 2/2015 | |
| KR | 101480630 B1 | 1/2015 | |
| WO | 2012113362 A1 | 8/2012 | |
| WO | WO-2012113362 A1 * | 8/2012 | ............ B60R 19/18 |
| WO | 2013095223 A1 | 6/2013 | |
| WO | 2015118925 A1 | 8/2015 | |

OTHER PUBLICATIONS

German Patent Office, German Search Report for German Application No. 102015004420.6, dated Jan. 14, 2016.

* cited by examiner

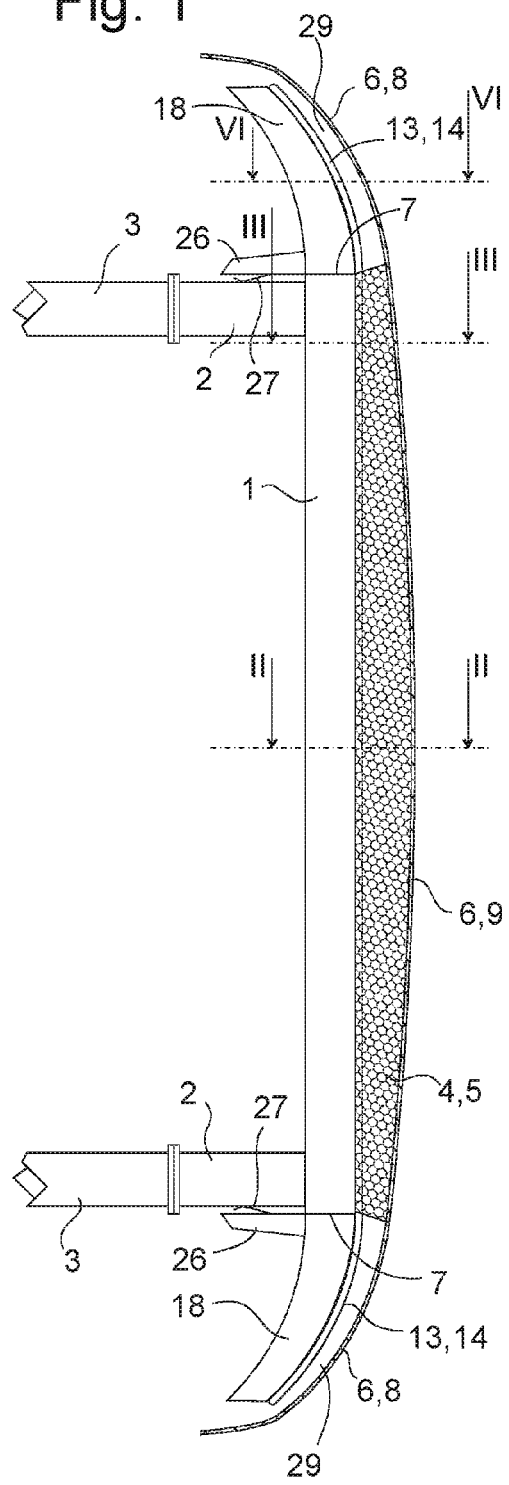
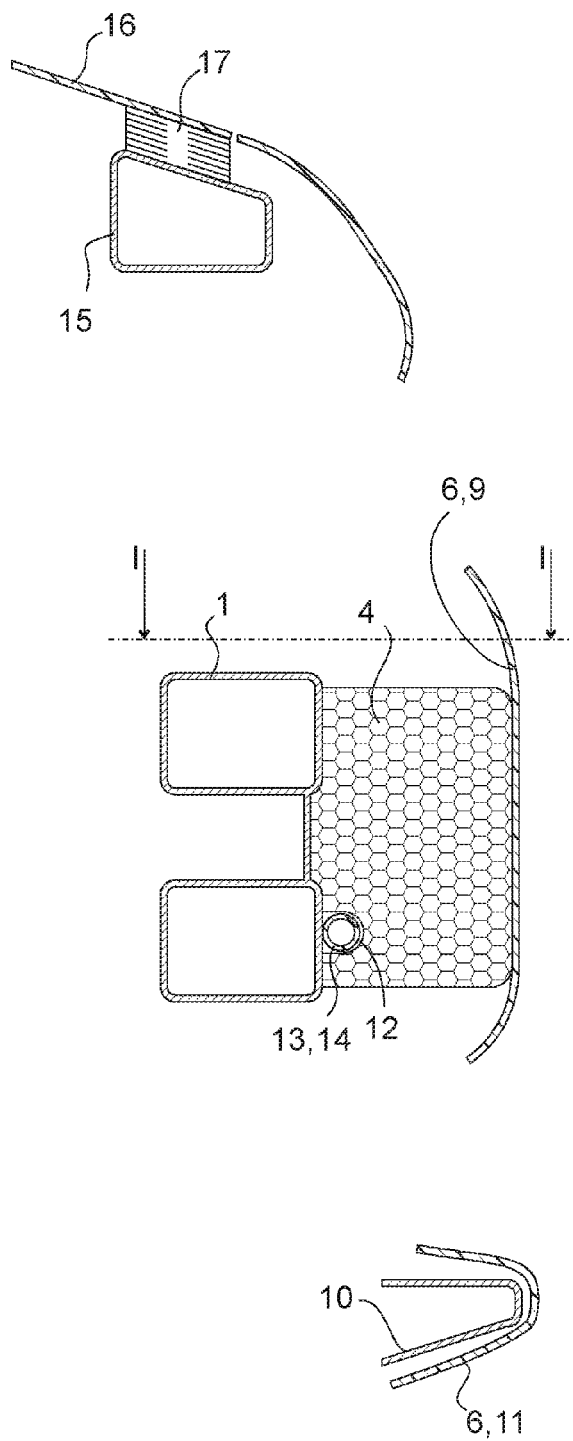

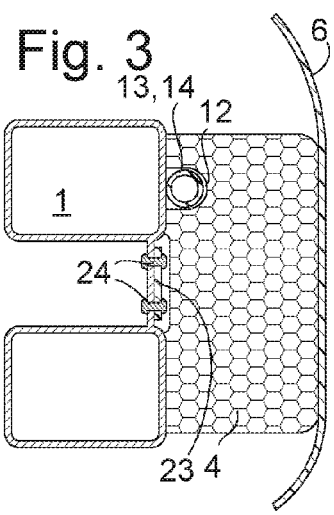
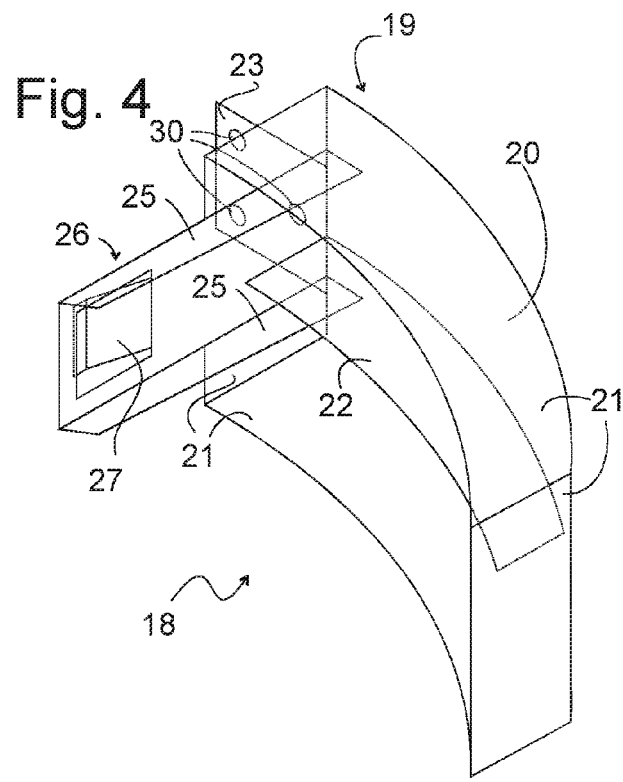
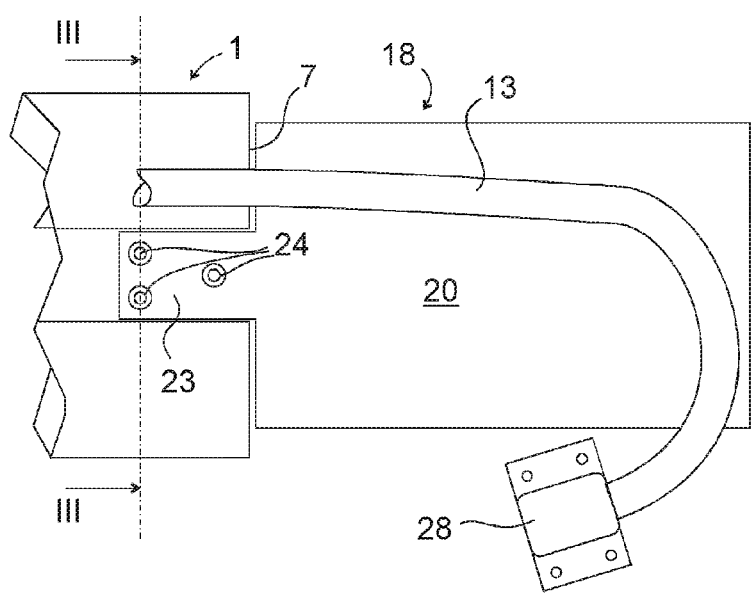
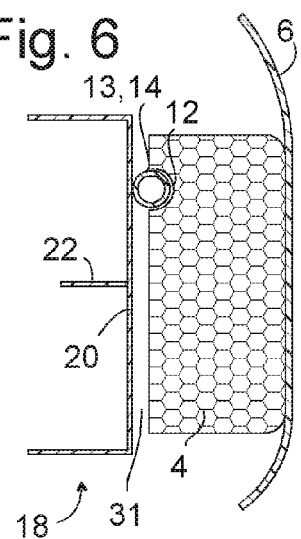

FRONT SECTION FOR A MOTOR VEHICLE

CROSS-REFERENCE TO RELATED APPLICATION

This application claims priority to German Patent Application No. 102015004420.6, filed Apr. 2, 2015, which is incorporated herein by reference in its entirety.

TECHNICAL FIELD

The present disclosure pertains to a front section for a motor vehicle, in which a shock sensor is arranged in an intermediate space between a bumper cross member and a bumper shell to detect a collision between the bumper shell and a pedestrian.

BACKGROUND

In a conventional front section, the width of the bumper cross member is considerably smaller than that of the bumper shell. If a central zone of the bumper shell strikes an external object and undergoes deformation as a result of such contact, this is detected reliably by the pressure sensor. In theory, however, peripheral zones of the bumper shell that are located beyond the ends of the bumper cross member, can be deformed to any degree, and this will not be detected by the shock sensor. Pedestrian protection measures that should be triggered in response to the signal from a shock sensor, are therefore not activated when only a peripheral zone of the bumper shell collides with the pedestrian and such a collision does not cause sufficient deformation of the central zone.

It might be feasible to adjust the width of the bumper cross member to the width of the bumper shell, but consequently this would mean that the edges of the bumper shell would have to satisfy the same requirements as the central zone with regard to a collision with a leg. For this, the front of the vehicle as far as the edges would have to be aligned essentially perpendicularly with the lengthwise direction of the vehicle; the rounding of bodywork corners, which is both aerodynamically favorable and helps to protect a pedestrian by guiding him to the side past the vehicle, is no longer possible.

SUMMARY

The present disclosure provides a front section for a motor vehicle that assures reliable detection of collisions between the bumper shell and an external obstruction in peripheral zones of the bumper as well, beyond the ends of the bumper cross member, without having to make the peripheral zones significantly more rigid.

According to one variant of the present disclosure, a front section for a motor vehicle includes a bumper shell, a bumper cross member and a shock sensor arranged in a central intermediate space between the bumper shell and the bumper cross member. The bumper shell extends beyond the ends of the bumper cross member in the transverse direction of the vehicle, by attaching extensions to the ends of the bumper member and distributing the shock sensor in peripheral intermediates spaces between the extensions and the bumper shell as well.

Since the extension constitute components that are physically separate from the bumper cross member, they may be constructed with a mechanical strength that differs substantially from that of the bumper cross member. In particular, these extensions should have just enough mechanical load-bearing capacity to guarantee that in the event of a collision with an object beyond the ends of the bumper cross member an impact is detected by the shock sensor before the extensions yield. It is self-evident that a wide range of variations is possible in terms of the choice of material and structure of the extensions, since the requisite load-bearing capacity of the extensions depends, among other things, on the sensitivity of the shock sensor.

In particular, due to the relatively low requirements the extensions have to satisfy in terms of load-bearing capacity, they may be manufactured inexpensively from plastic, in particular injection molded, whereas the bumper cross member should be a metal part. The central intermediate space between the bumper cross member and the bumper shell is preferably at least mostly filled with an energy absorption body.

In contrast, the peripheral Intermediate spaces do not need to be completely filled with an energy absorption body, so when the bumper shell is forced back under impact, it strikes the shock sensor essentially with full force. In this way, it is ensured that despite the low load-bearing capacity of the extensions it is possible to detect a sharp increase in the force acting on the shock sensor, thereby making it possible to detect a collision reliably, even if the magnitude of the force in quantitative terms is small.

In particular, the shock sensor may include a hose that passes through the central intermediate space and the peripheral intermediate spaces, and at least one pressure sensor, which is disposed on the hose to capture the pressure fluctuations that result from a collision.

The at least one pressure sensor may most simply be mounted on one end of the hose. Pressure sensor may be provided on both ends of the hose, firstly to enable redundant pressure measurement, and secondly to render the response time of the shock sensor largely independent of the site of the impact of the object on the bumper shell.

In order to avoid damage occurring to the pressure sensor in the event of a collision, the sensor should be arranged outside the peripheral intermediate spaces. In the peripheral intermediate spaces, the hose may protrude from a groove in an energy absorption body, so that it is exposed to a pressure shock immediately, even before compression of the energy absorption body begins.

The extensions may each include a front plate, over which the pressure sensor is spread, and ribs that project from the front plate toward the interior of the vehicle in order to provide rigidity. The flexibility of the extension under a load due to a collision, desirable within the scope of the present disclosure, may be achieved on the one hand by appropriate selection of a readily yielding material or low material thickness of the extension, but on the other hand also by an easily destructible anchoring of the extension, regardless of its structural flexibility. Such a connection may be created in particular if each extension includes a main body that extends the bumper cross member sideways, and a bracket that is fastened flush with a front side of the bumper cross member, and is thus subjected to a strong tensile load when a force directed toward the interior of the vehicle acts on the main body during a collision.

The bracket may be fastened to the bumper cross member by riveting or some other means. Such a fastening means concentrates the tensile forces that are created in the bracket during a collision in a small area and enables the extension to yield by pulling on the bracket whenever an easily reproducible maximum load-bearing capacity is exceeded. When the bumper cross member is fastened to the side members of the vehicle via crash boxes in a manner known per se, each extension may have one arm extending toward the vehicle interior, which is supported on one of the crash boxes.

The support should preferably consist of just a single pressure contact. In particular, the arm should not be connected structurally to the crash box by fastening elements, so that it does not interfere with the collapsing behavior thereof in the event of a crash. In order to compensate for any tolerances and to prevent gap corrosion, it may be necessary to provide a certain distance between the extension and the crash box. To avoid rattling due to contact with the crash box and at the same time guarantee that a defined distance is maintained, the arm may include a pretensioned spring which is in contact with the crash box. The shock sensor may serve in particular to actuate a drive unit, by which a front bonnet of the vehicle is raised in the event of a collision with a pedestrian.

BRIEF DESCRIPTION OF THE DRAWINGS

The present disclosure will hereinafter be described in conjunction with the following drawing figures, wherein like numerals denote like elements.

FIG. 1 is a horizontal cross section of a motor vehicle front section taken through I-I shown in FIG. 2;

FIG. 2 is a vertical cross section of the front section taken through II-II shown in FIG. 1 in the lengthwise direction of the vehicle;

FIG. 3 is a cross section taken through III-III shown in FIG. 1;

FIG. 4 is a perspective view showing an extension of the front section shown in FIGS. 1-3;

FIG. 5 is a view from the front of the extension fastened to one end of a bumper cross member; and FIG. 6 is a cross section taken through VI-VI shown in FIG. 1 according to an advanced variation.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

FIG. 1 shows a plan view of a bumper cross member 1, which is secured in a manner known per se to side members 3 via two crash boxes 2 mounted on the rear thereof, wherein the side members extend substantially for the entire length of the vehicle and constitute a major component of its bodywork. Bumper cross member 1 and crash boxes 2 are hollow profile elements made from metal, with a load-bearing capacity that is deliberately designed to absorb impact energy in the event of a collision with another vehicle or an object of similar weight, and to undergo deformation, thus also protecting side members 3 from deformation in a collision involving a smaller amount of energy.

An energy absorption body 4 fills an intermediate space 5 between a bumper cross member 1 and a bumper shell 6. Energy absorption body 4 may be for example a shaped element made of rigid foam or a thin-walled injection molded part, in particular with honeycomb structure. The mechanical load-bearing capacity of energy absorption body 4 and bumper shell 6 is considerably lower than that of bumper cross member 1 to enable bumper shell 6 to yield even if a collision involves a pedestrian, an animal or another object with relatively low mass.

The expanse of bumper cross member 1 in the transverse direction of the vehicle is approximately equivalent to the distance between side members 3, and it is much smaller than the corresponding dimension of bumper shell 6. In the case shown here, each of the ends 7 of bumper cross member 1 are approximately flush with the outer walls of crash boxes 2, so that outer zones 8 of bumper shell 6, which protrude laterally beyond side members 3, are not effectively braced to the rear by bumper cross member 1.

When a central zone 9 of bumper shell 6, located in front of bumper cross member 1, collides with a pedestrian, the first contact with the pedestrian is made by the part of bumper shell 6 that protrudes the farthest forward, that is to say, as shown in the cross section of FIG. 2, in a lower zone 11, at the height of the pedestrian's lower leg, and supported on an auxiliary member 10. Subsequently, the central zone 9 in front of bumper cross member 1 is pressed inwards, and the energy absorption body 4 located in between is compressed. A flexible hose 13 of a shock sensor 14 is routed in a groove 12 on the rear of energy absorption body 4, in contact with the front side of bumper cross member 1.

Pressure sensors 28 mounted on the ends of hose 13,—not shown in FIG. 2—detect a pressure shock, which is propagated in hose 13 when the hose is squeezed between energy absorption body 4 and bumper cross member 1. The output signal emitted by the pressure sensors 28 in response to the pressure shock triggers a raising movement of a front bonnet 16—shown in part in FIG. 2—which is supported on a bonnet lock bracket 15, enabling the front bonnet to prevent the pedestrian's head and torso from coming close to the engine block of the vehicle, if the pedestrian strikes bonnet 16 from above. In this illustration, a drive unit 17 for moving the front bonnet is represented schematically as an airbag arranged between front bonnet 16 and bonnet lock bracket 15; naturally, other drive units are also conceivable, such as pneumatic positioning cylinders, springs or similar for driving the bonnet movement.

A corresponding raising movement of front bonnet 16 or any other pedestrian protection measure should be able to be triggered reliably even if an impact with the pedestrian occurs not in central zone 9 but at one of the outer zones 8 of the bumper shell 6. To achieve this objective, yet at the same time to preserve the easy deformability of outer zones 8 that is due to the lack of support for zones 8 from bumper cross member 1, two extensions 18 are attached to the ends 7 of bumper cross member 1 as may again be seen in FIG. 1.

A diagrammatic perspective view of one of these two extensions 14, which are arranged in mirror symmetry with respect to each other, is shown in FIG. 4. Extension 18 has an approximately box-like base body 19 with a front plate 20 farthest from the observer in the perspective view of FIG. 4, and which extends the front side of bumper cross member 1 closest to energy absorption body 4 sideways. Front plate 20 is reinforced by side walls 21 that project from its edges into the vehicle interior, and which create a base body 19 having a structure like a box that is open to the vehicle interior. Additional reinforcing ribs 22, in this case a single horizontal rib, may extend across the inner side of front plate 20.

A bracket 23 protrudes from base body 19 as a flush elongation of front plate 20. As is shown in the cross section of FIG. 3, the bracket 23 is accommodated in a flat recess on the front side of bumper cross member 1 and fastened thereto with the aid of several rivets 24.

Side wall 21, which is located adjacent to bracket 23 and covers end 7 of bumper cross member 1, is itself rendered more rigid by ribs 25 protruding into base body 19 and extended toward the vehicle interior by an arm 26. As shown in FIG. 1, arm 26 extends along the outside of crash box 2 and at a small distance therefrom. A leaf spring 27 is disengaged from arm 26, and in the assembled state is slightly compressed by contact with the outside of the crash box. This causes a bending stress to be applied to extension 18 between leaf spring 27 and bracket 23, thereby ensuring that it the extension is seated without free play on bumper cross member 1 and preventing vibrations while travelling from causing the extension 18 to rattle.

As may be seen in FIG. 1 and particularly in the front view of FIG. 5, hose 13 of shock sensors 14 extends beyond the ends 7 of bumper cross member 1 as far as front plates 20 of the extensions 18 mounted there. The previously described pressure sensors 28 of shock sensors 14 as shown to be freely suspended in FIG. 5, but in practice they are secured to extension 18 or, if the length of hose 13 permits it, to bumper cross member 1 at one location, for example to the underside or rear thereof, where they are not exposed to any risk of damage if bumper shell 6 is forced back into the vehicle interior in a collision.

Although intermediate space 5 between bumper cross member 1 and central zone 9 of bumper shell 6 is substantially filled with the energy absorption body 4, a corresponding intermediate space 29 between extension 18 and the hose 13 that extends across both the front plate 20 thereof and the outer zone 8 of bumper shell 6 is empty, so that if outer zone 8 collides with an external object, initially it is able to be deflected into intermediate space 29 without placing any load on extension 18. Thus bumper shell 6 initially comes into contact with hose 13 essentially with full force, compressing it so that an increase in the hydrostatic pressure in hose 13 is detected by the pressure sensors 28. The compressive force exerted by bumper shell 6 is transferred via hose 13 to extension 18 and applies a tensile load to the longitudinal direction of bumper cross member 1 on bracket 23.

The load-bearing capacity of bracket 23 is adjusted to the sensitivity of the pressure sensors 28 in such manner that the pressure in hose 13 at which bracket 23 tears away from the holes 30 in which rivets 24 are located is slightly higher than the pressure required to detect a collision and trigger drive unit 17. Since the load-bearing capacity of extension 18 is low compared with the other components of the front section, it has no perceptible effect on deformation behavior in the event of a collision, its function is limited to offering just enough resistance to the yielding outer zone 8 of bumper shell 6 as is necessary for shock sensor 14 to detect the occurrence of the collision, so that effective pedestrian protection is assured even if a collision occurs in outer zone 8.

FIG. 6 shows a cross section through outer zone 8 of bumper shell 6, extension 18 and intermediate space 29 according to a further development of the present disclosure. In this case, energy absorption body 4 is extended on both sides as a single part into peripheral intermediate spaces 29, but groove 12 is shallower than the diameter of the hose 13 that is seated therein, and consequently a gap 31 remains between the energy absorption body 4 and the extension 18. If bumper shell 6 and energy absorption body 4 are forced backwards in an impact on outer zone 8, hose 13 is immediately compressed between energy absorption body 4 and extension 18, and pressure sensor 28 registers in increase in pressure even for small deflection of bumper shell 6, before energy absorption body 4 is compressed, or even if it is not.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A front section of a motor vehicle comprising:
   a bumper cross member having an extension attached to each end thereof;
   a bumper shell extending beyond the ends of the bumper cross member in a direction transverse to the vehicle; and
   a shock sensor arranged in a central intermediate space between the bumper shell and the bumper cross member and extending into a peripheral intermediate space between each extension and the bumper shell,
   wherein each extension comprises a front plate over which a pressure sensor is spread and ribs protruding from the front plate into a vehicle interior.

2. The front section according to claim 1, wherein the shock sensor comprises a hose running through the central intermediate space and the peripheral intermediate spaces and the pressure sensor is operably coupled to the hose.

3. The front section according to claim 2, further comprising an energy absorption body at least partially disposed in the central intermediate space.

4. The front section to any one of claim 3, wherein the energy absorption body is at least partially disposed in the peripheral intermediate spaces and the hose protrudes from a groove formed in the energy absorption body in the peripheral intermediate spaces.

5. The front section according to claim 2, wherein the pressure sensor is operably coupled to at least one end of the hose.

6. The front section according to claim 5, wherein the pressure sensor is located outside of the central intermediate space and the peripheral intermediate space.

7. The front section according to claim 1, wherein each extension comprises a main body extending the bumper cross member sideways and a bracket fastened to and flush with a front side of the bumper cross member.

8. The front section according to claim 7, wherein the bracket is fastened to the bumper cross member with rivets.

9. The front section according to claim 1, wherein the bumper cross member is fastened to side members of the vehicle with crash boxes, wherein each extension has an arm extending toward the vehicle interior and supported on an associated crash box.

10. The front section according to claim 1, further comprising a front bonnet and a drive unit configured to move the front bonnet relative to a vehicle body, wherein the drive unit is actuatable by the shock sensor.

11. A front section of a motor vehicle comprising:
    a bumper cross member having an extension attached to each end thereof;

a bumper shell extending beyond the ends of the bumper cross member in a direction transverse to the vehicle; and a shock sensor arranged in a central intermediate space between the bumper shell and the bumper cross member and extending into a peripheral intermediate space between each extension and the bumper shell, wherein the bumper cross member is fastened to side members of the vehicle with crash boxes, each extension has an arm extending toward the vehicle interior and supported on an associated crash box and the arm comprises a pretensioned spring in contact with the crash box.

* * * * *